United States Patent [19]
Dziulak

[11] 3,946,095
[45] Mar. 23, 1976

[54] METHOD OF RESTORING THE SHAPE OF A FLEXIBLE-SHELL MODEL

[75] Inventor: Paul J. Dziulak, Chicago, Ill.

[73] Assignee: Carnation Company, Los Angeles, Calif.

[22] Filed: Dec. 3, 1973

[21] Appl. No.: 420,875

[52] U.S. Cl. .................... 264/36; 35/17; 264/46.6; 264/269; 428/71; 428/76; 428/141; 428/160; 428/315; 428/425
[51] Int. Cl.² ................... B29D 27/04; B32B 35/00
[58] Field of Search ........ 264/45, 36, 46.6, 36, 267, 264/269; 161/20; 35/17; 46/115; 428/71, 76, 141, 160, 315, 425

[56] References Cited
UNITED STATES PATENTS

| | | | |
|---|---|---|---|
| 2,763,070 | 9/1956 | McCormick | 35/17 |
| 2,971,272 | 2/1961 | Barlow | 35/17 |
| 3,009,267 | 11/1961 | Bezark | 35/17 |
| 3,152,199 | 10/1964 | Roberts | 264/45 |
| 3,258,511 | 6/1966 | McGregor | 264/45 |
| 3,288,896 | 11/1966 | Hendricks | 264/45 |

FOREIGN PATENTS OR APPLICATIONS

| | | | |
|---|---|---|---|
| 653,600 | 12/1962 | Canada | 264/45 |
| 656,199 | 1/1963 | Canada | 264/45 |
| 1,280,851 | 11/1961 | France | 264/45 |

OTHER PUBLICATIONS

Billmeyer, Fred W. *Textbook of Polymer Science*, New York, Interscience, c.1962, pp. 463–484.
Whittington, Lloyd R. *Whittington's Dictionary of Plastics*, Stamford, Conn., Technomic, c.1968, pp. 59–60.

Primary Examiner—Philip Anderson
Attorney, Agent, or Firm—Charles E. Quarton

[57] ABSTRACT

A method of restoring the shape of an anatomical model comprising placing mold inserts in the undercut portions of the model, charging the model with a foaming thermosetting plastic, and enclosing the model and mold inserts in a fixture. As the foaming thermosetting plastic expands, the model is pressed against the inserts and the fixture causing the model to assume the shape of the fixture and inserts.

10 Claims, 10 Drawing Figures

METHOD OF RESTORING THE SHAPE OF A FLEXIBLE-SHELL MODEL

The invention relates to a method of restoring the shape of an anatomical model to a desired standard form. More particularly, the invention relates to a method of restoring the shape of an anatomical model in which the original casting is in the form of a hollow shell. The shell of the model is accurately sized to a standard form in order that the parts associated with the finished model fit properly in the model. Thus, the internal parts of the anatomical model can be accommodated within the internal cavity of the model in the proper positions and a chest plate for covering the internal cavity of the model fits properly in the opening of the internal cavity.

The shell of the model is typically formed with conventional casting techniques such as rotary casting. The shell of the model has numerous areas where undercuts are present and thus the shell cannot be simply removed from the cast. Therefore, the shell is pulled from the cast while still pliable in order that the undercut portions can be stretched away from the undercuts and removed. This removal of the shell of the model distorts the shape of the shell from the shape formed by the cast.

It is an object of the present invention to provide a method of restoring the shape of the hollow shell of the model to an accurate standard form.

It is another object of the present invention to rigidly fix the shape of the hollow shell of the model in conformance with the standard form.

It is a further object of the present invention to provide a method of restoring and rigidly fixing the shape of a model which has substantial undercut portions therein.

In summary, the method of the present invention comprises positioning inserts in the undercut portions of the model and charging the model with the foaming thermosetting plastic. The surfaces of the inserts which contact the model have the shape of the standard form. The model and the inserts are enclosed in a fixture which conforms to the desired shape of the model and exterior of the inserts. The foaming thermosetting plastic is cured while the model is retained by the inserts and enclosing fixture with the result that the pressure applied by the foaming plastic presses the model outward against the inserts and the enclosing fixture to accurately restore the shape of the model.

Other features of the invention will become apparent from a review of the detailed description and the drawings, in which drawings.

Figure 1:
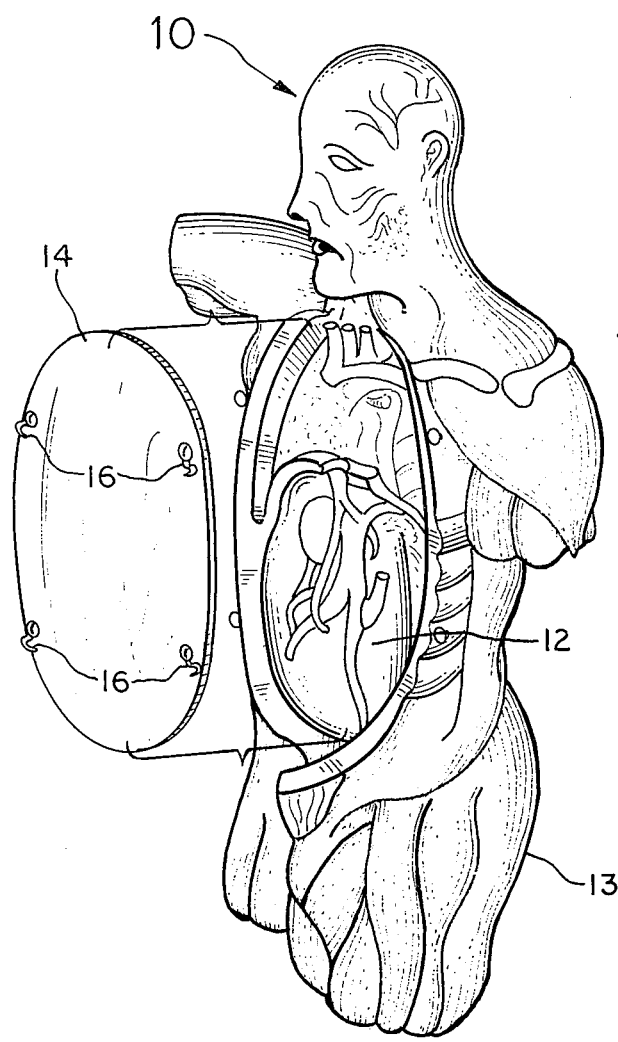
FIG. 1 is a perspective view of an anatomical model which has been constructed using the method of restoring shape of the present invention.
Figure 2:
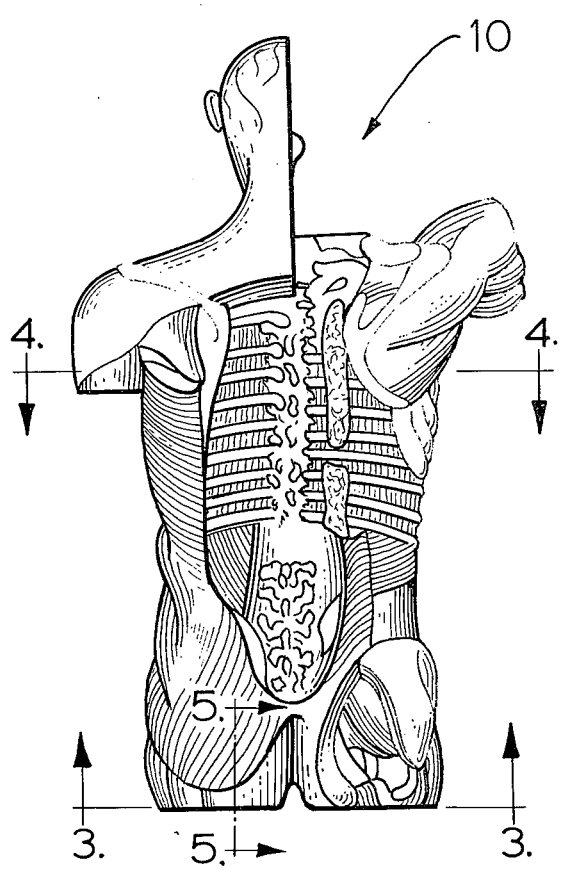
FIG. 2 is a back view of the model of FIG. 1.

Referring to FIG. 1, an anatomical model that has been constructed in accordance with the method of the present invention is illustrated generally by the numeral 10. The model 10 comprises the torso portion of the human body and can be used for teaching anatomy. The model 10 includes internal parts 12 which are placed within an internal cavity 13 of the model. The internal parts 12 of the model are covered with a chest plate 14 that is held in place with suitable fasteners 16. In order that the internal parts 12 can fit properly within the internal cavity 13 and that the chest plate 14 fits properly within the opening of the internal cavity 13, it is important that the body of the model be accurately sized.

The anatomical model 10 includes a torso shell 18 that is formed by using conventional casting techniques such as rotary casting. The torso shell 18 can be formed from a thermo-setting elastomer or a thermoplastic elastomer of a suitable type as is well known in the art.

Figure 3:
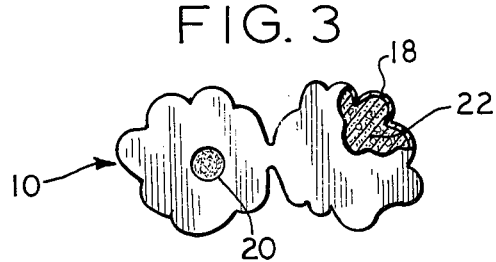
FIG. 3 is a bottom view of the model taken along line 3—3 of FIG. 2.
Figure 4:
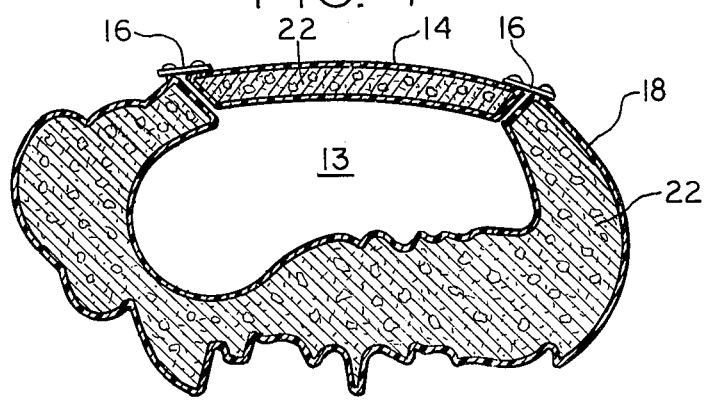
FIG. 4 is a sectional view of the model taken along line 4—4 of FIG. 2.
Figure 5:
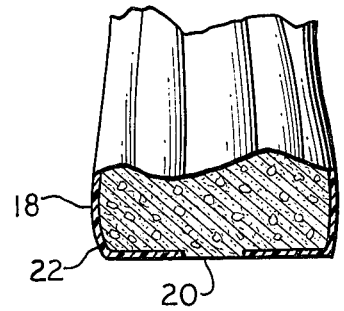
FIG. 5 is a sectional view of the model taken along line 5—5 in FIG. 2.

Referring to FIGS. 3, 4 and 5, the torso shell 18 is filled with a foamed thermoset plastic 22 which rigidly holds the torso shell in the desired standard shape after the method of restoring shape has been completed. A charging port 20 is provided in the base of the model 10 for allowing a foaming thermosetting plastic to be placed within the torso shell 18 in accordance with the method of the present invention.

The anatomical model 10 has a considerable number of undercut portions throughout various areas on the model. The undercut areas are particularly apparent in the internal cavity 13 as shown in FIG. 4. The torso shell 18 is removed from the original cast while still pliable in order to stretch the undercut portions of the torso shell away from the cast and thereby permit removal of the shell. When the torso shell 18 is removed in this manner, the shell is distorted from the original shape formed within the cast. As a result, the torso shells 18 which have been removed from the cast vary greatly in their dimensions. It is necessary to restore the shape of the torso shell 18 to a standard configuration in order that the internal parts 12 will fit within the internal cavity 13 and the chest plate 16 will fit in the opening of the cavity.

Figure 6:
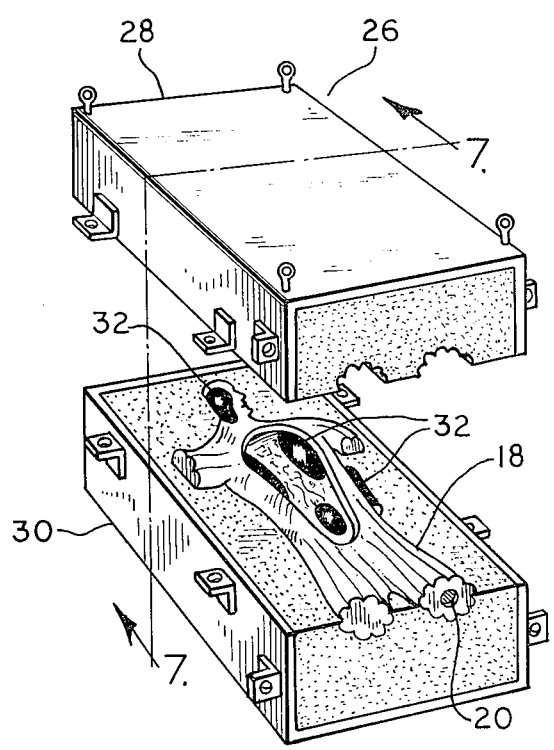
FIG. 6 is an exploded perspective view illustrating placement of the model in a fixture in accordance with the method of the present invention.
Figure 8:
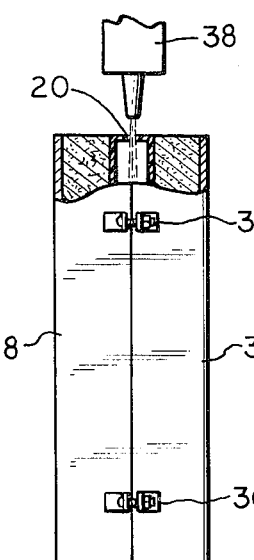
FIG. 8 is a schematic view illustrating charging of the model with a foaming plastic in accordance with the method of the present invention.
Figure 8A:
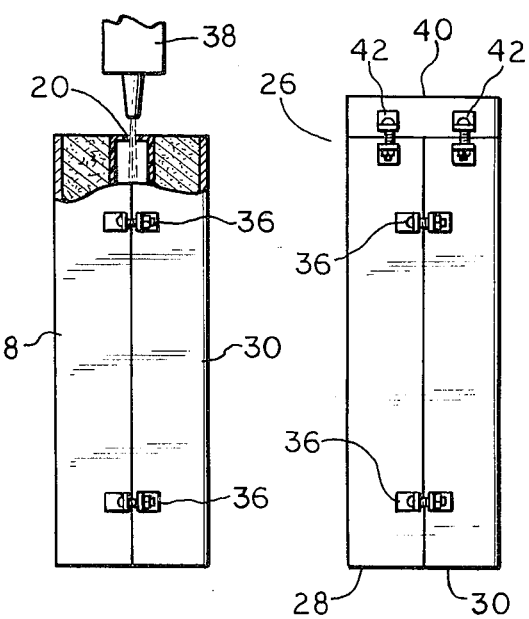
FIG. 8a illustrates the closure of the fixture after being charged with a foaming plastic in accordance with the method of the present invention.
Figure 7:
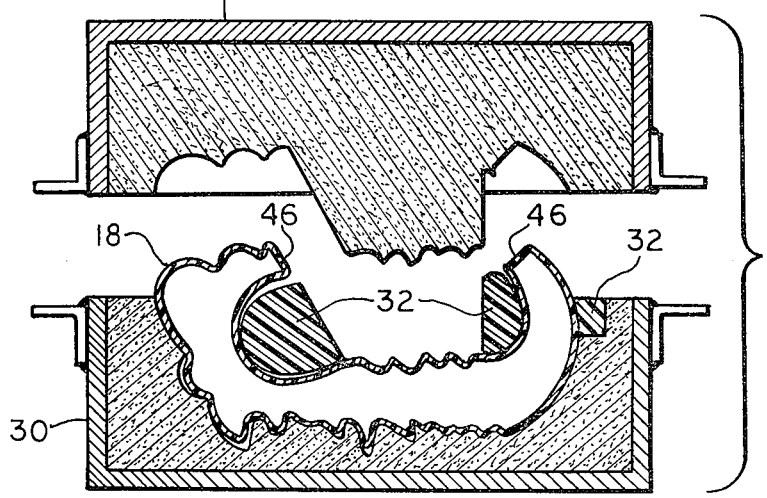
FIG. 7 is a sectional view of the fixture and model taken along line 7—7 in FIG. 6.

Referring to FIGS. 6 and 7, inserts 32 are formed and placed in the undercut portions of the torso shell 18. The surface of the inserts 32 which contacts the torso shell 18 have a configuration conforming to the standard shape which is desired for the model 10. An enclosing fixture 26 comprising a top fixture 28, a bottom fixture 30 and an end fixture 40 (shown in FIG. 8a) is formed for engaging the torso shell 18 and the inserts 32. The surfaces of the enclosing fixture 26 which contact the torso shell 18 form the standard shape to which the torso shell 18 is to be restored.

After the inserts 32 have been placed in the appropriate portions of the torso shell 18, the top fixture 28 and the bottom fixture 30 are closed together by suitable fasteners 36 around the torso shell and the inserts. The torso shell 18 is then charged with a foaming thermosetting plastic through the charging port 20. Preferably, the forming thermosetting plastic is injected by a conventional machine 38 which mixes the foaming thermosetting plastic and meters a precise amount of the plastic for discharge. After the foaming thermosetting plastic is charged into the torso shell 18, the end fixture 40 is secured in place with suitable fixtures 42 and the enclosing fixture 26 entirely surrounds the torso shell 18.

Figure 9:
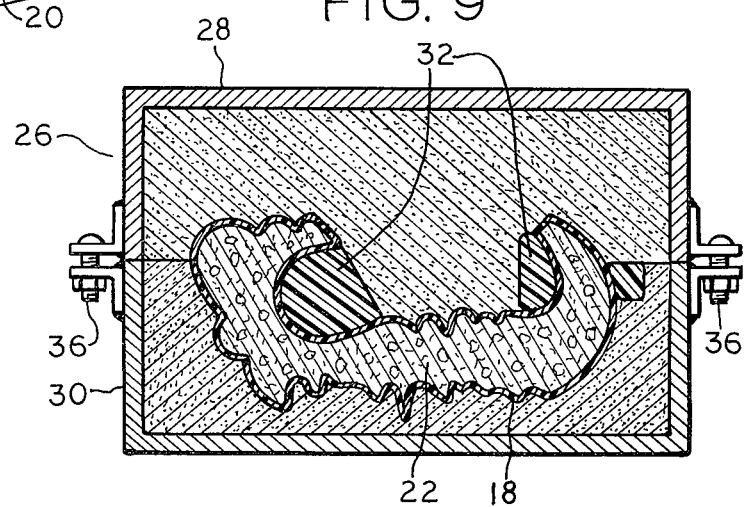
FIG. 9 is a sectional view of the fixture and model after the shape of the model has been restored along the same location as FIG. 7.

Referring to FIG. 9, as the foaming plastic expands with the torso, pressure is exerted against the torso shell 18 and the torso shell 18 is pressed outward against the enclosing fixture 26 and the inserts 32. Thus, the torso shell 18 assumes the shape of the contacting surfaces of the enclosure fixture 26 and the inserts 32 thereby restoring the shape of the torso shell 18 to a standard. As the foaming thermosetting plastic expands within the torso shell 18, air within the shell is released through venting apertures 46 in the shell. After the foaming thermosetting plastic in the torso shell 18 has cured, the enclosing fixture 26 is disassembled and the inserts 32 are removed. The shape of the anatomical model 10 has then been restored and additional manufacture of the model can take place.

The amount of foaming plastic which is charged into the torso shell 18 must be carefully measured. If an insufficient amount of foaming thermosetting plastic is placed within the torso shell 18, voids will appear in the torso shell and portions of the shell will not be subjected to restoring pressure. Also, if too great an amount of foaming thermosetting plastic is placed in the torso shell, the expansion forces can burst the enclosing fixture 26.

In order to determine the correct amount of foaming thermosetting plastic for charging the torso shell 18, a small amount of foaming thermosetting plastic is placed within the torso shell 18. The torso shell 18 is then cut into cross sections and inspected for voids which have not been filled with foamed thermoset plastic. The amount of foaming thermosetting plastic charged into the shell is then increased with another sample torso shell by a measured amount. This completed torso shell is then again sectioned and inspected for voids. This process continues until a sufficient amount of foaming thermosetting plastic has been placed in the torso shell 18 to completely eliminate all voids within the torso shell and press the shell against the standard form provided by the enclosing fixture 26 and inserts 32.

The foaming thermosetting plastic utilized in the method of the present invention can be of any suitable type. However, preferably the foaming thermosetting plastic comprises low density foaming urethane. The foaming urethane in the preferred form of the method has a free rise density of approximately two pounds per cubic foot. Inspections of samples of the foamed thermoset plastic 22 within the torso shell 18 indicate that the foamed thermoset plastic within the torso shell 18 has a density in the range of 8–11 pounds per cubic foot when allowed to cure within the enclosing fixture 26.

The enclosing fixture 26 is constructed to withstand the high internal pressures generated by the foaming thermosetting plastic pressing against the torso shell 18. Also, the surfaces of the enclosing fixture 26 which contact the model shell must be accurately shaped in accordance with the configuration of the standard form which is desired for the shape of the torso shell. The enclosing fixture can be constructed with a steel exterior filled with an epoxy and sand mixture molded to the desired form.

It will be appreciated that the same process of restoring shape can be utilized to restore the shape of the chest plate 14. Thus, the chest plate 14 is filled with a foamed plastic 22 which has been charged into the chest plate in accordance with the method of the present invention and placed within an enclosing fixture.

The foamed thermoset plastic 22 within the torso shell 18 forms a rigid support for the torso shell. Thus, the shape of the torso shell 18 will be retained and the shell will be strengthened by the foamed thermoset plastic.

It is to be understood that various modifications can be made to the disclosed method without departing from the scope of the invention and it is intended to cover in the appended claims all such modifications as fall within the true spirit and scope of the invention.

What is claimed is:

1. A method of restoring the shape of a flexible-shell model having undercut portions comprising:
    positioning inserts having a fixed standard shape in the undercut portions of the flexible-shell model;
    charging the flexible-shell model with a measured amount of a foamable thermosetting plastic;
    enclosing the flexible-shell model and associated inserts in a fixture configured to resist internal pressure and maintain a fixed standard shape;
    foaming and curing the foamable thermosetting plastic in the flexible-shell model while the flexible-shell model is enclosed in the fixture and is forced outward by the foaming thermosetting plastic against the fixed standard shape of the fixture and the inserts.

2. The method of claim 1 further including forming the inserts to be positioned in the undercut portions of the model with a surface having a desired standard shape.

3. The method of claim 1 further including forming the fixture to enclose the model and associated inserts with a surface having a desired standard shape.

4. The method of claim 1 wherein said step of enclosing the model includes fastening a top fixture and a bottom fixture over the model and associated inserts.

5. The method of claim 4 further including fastening an end fixture over a charging port in the model after the model has been charged with a foaming plastic.

6. The method of claim 1 further including venting air from the model as the foamable thermosetting plastic expands within the model.

7. The method of claim 1 wherein the foamable thermosetting plastic being charged into the model is a foamable urethane having a low density.

8. The method of claim 7 wherein the foamable urethane has a free rise density of approximately 2 pounds per cubic foot.

9. The method of claim 1 wherein the measured amount of foamable thermosetting plastic charged into the model achieves a density in the range of 8–11 pounds per cubic foot after curing.

10. The method of claim 1 further comprising removing the enclosing fixture from the model after the foamable thermosetting plastic has cured and removing the inserts from the undercut portions of the model.

* * * * *